United States Patent [19]
Kawaguchi et al.

[11] Patent Number: 5,681,204
[45] Date of Patent: Oct. 28, 1997

[54] DEVICE FOR DETECTING A DISPLACEMENT OF A BLADE MEMBER OF A SLICING APPARATUS

[75] Inventors: Keishi Kawaguchi; Yoshihiro Tadera; Tatsumi Hamasaki; Isao Matsumoto, all of Hiroshima, Japan

[73] Assignee: Toyo Advanced Technologies Co., Ltd., Hiroshima-ken, Japan

[21] Appl. No.: 559,406

[22] Filed: Nov. 15, 1995

[30] Foreign Application Priority Data

Nov. 24, 1994 [JP] Japan ................................. 6-289474

[51] Int. Cl.$^6$ .................................................. B24B 49/16
[52] U.S. Cl. ............................... 451/9; 451/10; 451/41; 125/13.02
[58] Field of Search ........................... 451/5, 7, 8, 9, 451/10, 41, 28, 69, 44; 125/13.01, 13.02, 11.04, 11.18

[56] References Cited

U.S. PATENT DOCUMENTS

| | | | |
|---|---|---|---|
| 4,971,021 | 11/1990 | Kubotera et al. | 125/13.01 |
| 5,025,593 | 6/1991 | Kawaguchi et al. | 125/13.02 |
| 5,030,910 | 7/1991 | Junge et al. | 324/207.15 |
| 5,383,444 | 1/1995 | Kimura | 125/13.02 |
| 5,458,526 | 10/1995 | Tsukada et al. | 125/13.02 |

*Primary Examiner*—Eileen Morgan
*Attorney, Agent, or Firm*—Jordan and Hamburg

[57] ABSTRACT

A detecting device for use in a slicing apparatus which includes a blade member having an internal cutting edge in the form of a circle, a rotating driver for rotating the blade member about a center of the circle of the internal cutting edge, and a radial movement driver for producing a relative movement between the blade member and a work in a radial direction of the blade member so that an end portion of the work is cut into a piece by the internal cutting edge of the blade member, the detecting device being adapted for detecting a displacement of the blade member, includes: a detector which is disposed at a position being spaced away from the blade member and the work and allowing the piece in the process of being cut to intervene between the detector and the blade member and being operable to detect a distance to a specified position of the blade member; and a corrector which is operable to eliminate an influence to the distance detection which is caused by the intervention of the piece.

15 Claims, 6 Drawing Sheets

DEVICE FOR DETECTING A DISPLACEMENT OF A BLADE MEMBER OF A SLICING APPARATUS

BACKGROUND OF THE INVENTION

The present invention relates to a device for detecting a displacement of a blade member of a slicing apparatus for cutting a work, such as semiconductor ingot, to produce a semiconductor wafer.

Conventionally, there have been known slicing apparatus in which a work is placed in a central hole of a flat, circular, ringed blade member having an internal cutting edge at an internal circumferential periphery thereof so as to slightly cross over the internal cutting edge in an axial direction of the blade member, and is moved against the internal cutting edge in a radial direction of the rotating blade member to produce a wafer.

In such a slicing apparatus, the blade member is likely to flex during cutting operation, which consequently causes a deterioration in the machining accuracy. To eliminate such deterioration, flexure detection of the blade member has been conducted in various manners. An eddy current type distance detecting sensor has been used as detector means. Such a distance detecting sensor is arranged in such a position as to face the blade member to detect the distance between the sensor and the blade member at a specified interval and output a variation of the detected distance as a displacement of the blade member.

During the slicing operation, a work comes into contact with an inner portion of the blade member for a longest period. A displacement or flexure of the blade member at the inner portion thereof most adversely affects the machining accuracy. Accordingly, it is most preferable to detect a displacement of the blade member at the inner portion. However, since the inner portion of the blade member and its inner periphery overlap a movement region in which the work is moved for cutting feed, it is required to make special efforts to avoid the likelihood that the sensor interferes the work in the feeding process.

To eliminate the above drawbacks, Japanese Unexamined Patent Publication No. 4-138210 discloses that a flexure amount detecting sensor of eddy current type is arranged in such a position as to face a forward end of a work in a slicing operation to detect a flexure amount at a specified portion of a blade member by which the work is being cut, and more particularly a flexure amount at an inner portion of the blade member through a wafer being sliced off from the work. According to this publication, the flexure amount detecting sensor can be arranged close to the inner portion of the blade member without interfering the work being fed in the cutting feed direction during the slicing operation, thereby detecting the flexure amount of blade member at the specified position.

In the conventional apparatus, a flexure amount of the blade member is detected by the sensor while a sliced-off wafer is being positioned between the sensor and the blade member. However, there are some works which have a low electrical resistivity and high conductivity similar to metal. In the case of a work having a high conductivity being cut, a wafer which is to be obtained by the slicing operation and is positioned between the blade member and the sensor gives a great influence to the detection of displacement of the blade member.

Figure 7:
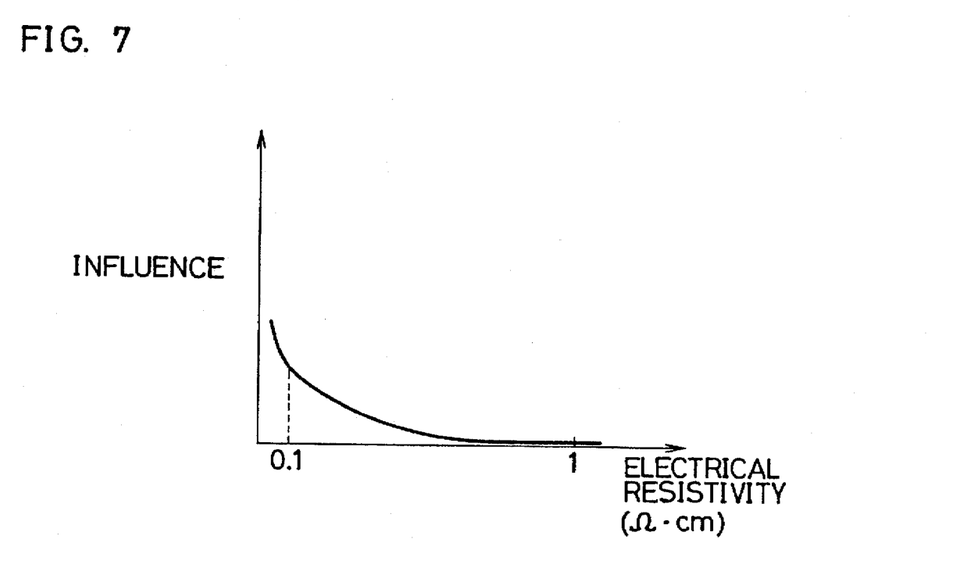
FIG. 7 is a graph showing relationship between the electrical resistivity of a work and influence of an intervening wafer to the detection result of the flexure detecting sensor.

FIG. 7 shows a relationship between the electrical resistivity of a work and influence of an intervening wafer to a detection result of an eddy current type sensor. For example, in the case where the electrical resistivity of the work is not smaller than 1Ω·cm, it will be seen that the intervention of the wafer little affects the detection result of the sensor. On the contrary, in the case where the electrical resistivity is decreased to or about 0.1Ω·cm, it will be seen that the intervention of the wafer inevitably affects the detection result of the sensor.

SUMMARY OF THE INVENTION

It is an object of the present invention to provide a blade member displacement detecting device for use in a slicing apparatus which has overcome the drawbacks residing in the prior art.

It is another object of the present invention to provide a blade member displacement detecting device which can assure a greatly increased accuracy in the detection of a displacement of a blade member.

The present invention is directed to a detecting device for use in a slicing apparatus which includes a blade member having an internal cutting edge in the form of a circle, a rotating driver for rotating the blade member about a center of the circle of the internal cutting edge, and a radial movement driver for producing a relative movement between the blade member and a work in a radial direction of the blade member so that an end portion of the work is cut into a piece by the internal cutting edge of the blade member, the detecting device being adapted for detecting a displacement of the blade member, comprising: a detector which is disposed at a position being spaced away from the blade member and the work, and allowing the piece in the process of being cut to intervene between the detector and the blade member, and operable to detect a distance to a specified position of the blade member; and a corrector which is operable to eliminate an influence to the distance detection which is caused by the intervention of the piece.

The corrector may be provided with a correction setting portion which sets a correction value for the distance detection based on a change in the distance detection between before the intervention of the piece and after the intervention of the piece.

The correction setting portion may be preferably made to set, as a correction value, a difference between a first amount detected when the rate of change in detected amounts becomes larger than a first predetermined value and a second amount detected when the rate of change in detected amounts becomes smaller than a second predetermined value after becoming larger than the first predetermined value, the second predetermined value being smaller than the first predetermined value.

Also, it may be preferable that the correction setting portion includes a storage portion for storing a starting position at which the intervention of the piece starts, and sets, as a correction value, a difference between a first amount detected just before the relative movement of the blade member and the work reaches the starting position and a second amount detected just after the relative movement of the blade member and the work reaches the starting position.

Further, the corrector may be provided with a storage portion for storing a correction value in accordance with a resistivity of the work to correct detected amounts based on the stored correction value.

The corrector may be preferably made to execute the correction of detected amounts after the rate of change in detected amounts becomes larger than a first predetermined value and thereafter becomes smaller than a second predetermined value which is smaller than the first predetermined value.

The corrector may be preferably provided with a storage portion for storing a starting position at which the intervention of the piece starts. The corrector executes the correction of detected amounts after the relative movement of the blade member and the work reaches the starting position.

With the inventive detecting device, there is provided the corrector which is operable to eliminate an influence to the distance detection which is caused by the intervention of the piece. Accordingly, this detecting device makes it possible not only to detect a displacement of the blade member while allowing intervention of a cut piece before the detector but also to eliminate the influence of the cut piece intervention to the displacement detection and ensure accurate detection reliably.

The corrector is provided with a correction setting portion which sets a correction value for the distance detection based on a change in the distance detection between before the intervention of the piece and after the intervention of the piece. Accordingly, even if there is a variation in the thickness and flatness of cut pieces, a suitable correction value can be determined, which thus assures accurate detection.

As a correction value, a difference is determined and set which is between a first amount detected when the rate of change in detected amounts becomes larger than a first predetermined value and a second amount detected when the rate of change in detected amounts becomes smaller than a second predetermined value after becoming larger than the first predetermined value, the second predetermined value being smaller than the first predetermined value. Accordingly, the intervention of cut piece can be detected accurately irrespective of the shape or dimension of the work, thus enabling the correction to be performed reliably.

As a correction value, also, a difference is determined and set which is between a first amount detected just before the relative movement of the blade member and the work reaches the starting position and a second amount detected just after the relative movement of the blade member and the work reaches the starting position. This makes easier the detection of the intervention of cut piece because the start of the intervention is determined only based on the relative movement position.

In the case that the corrector is provided with a storage portion for storing a correction value in accordance with a resistivity of the work and detected amounts are corrected based on the stored correction value, the correction of detected amounts can be performed more easily.

Further, the correction of detected amounts is executed after the rate of change in detected amounts becomes larger than a first predetermined value and thereafter becomes smaller than a second predetermined value which is smaller than the first predetermined value, or after the relative movement of the blade member and the work reaches the starting position. Accordingly, the correction to eliminate the influence of intervention can be reliably performed at the suitable timing.

These and other objects, features and advantages of the present invention will become more apparent upon a reading of the following detailed description and accompanying drawings.

DETAILED DESCRIPTION OF THE PREFERRED EMBODIMENTS OF THE INVENTION

An embodiment of the present invention will be described with reference to the accompanying drawings.

Figure 2:
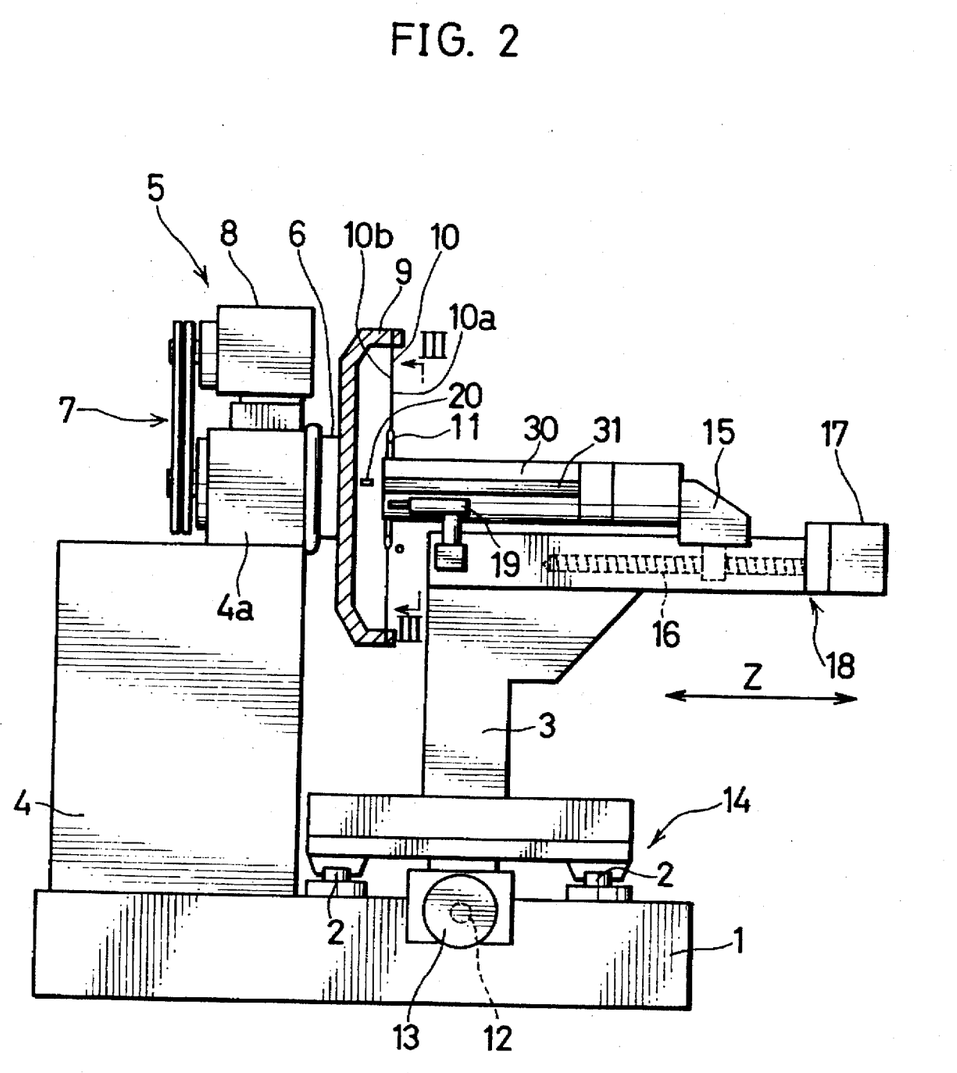
FIG. 2 is a front view showing an overall construction of the slicing apparatus.
Figure 3:
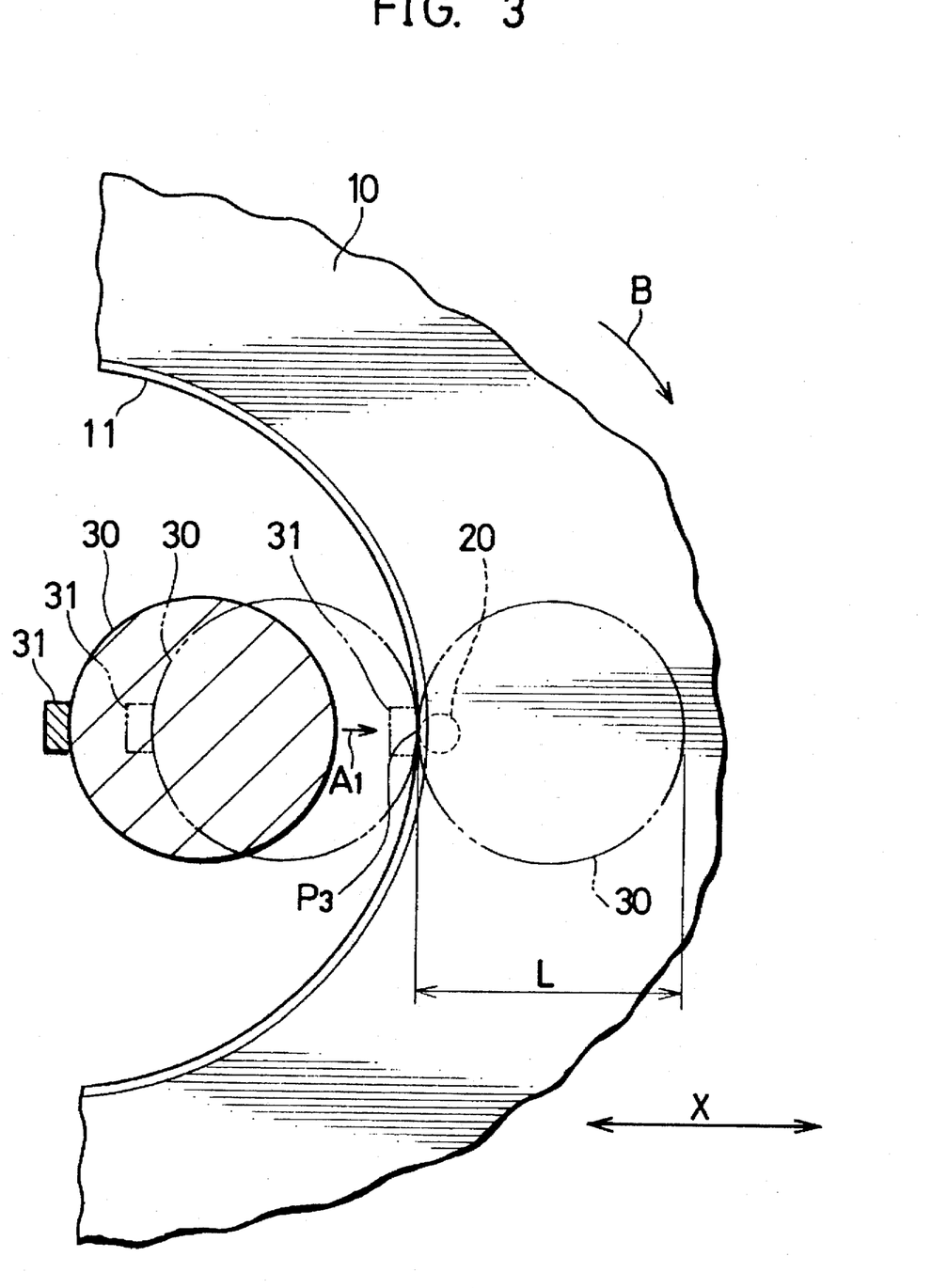
FIG. 3 is a sectional view taken along the line III—III in FIG. 2.

A slicing apparatus, as shown in FIGS. 2 and 3, comprises a base 1 on which parallel guide rails 2, 2 are provided. A slide table 3 is mounted on these guide rails 2, 2 to slide thereon.

A main spindle base 4 is provided on the base 1 at a position facing the slide table 3. This main spindle base 4 carries a main bearing 4a. The main bearing 4a supports one end of a main spindle 6 rotatably. The main spindle 6 is driven by a spindle drive motor 8 through a belt mechanism 7 provided between one end of the main spindle 6 and an output shaft of the spindle drive motor 8. The other end of the main spindle 6 is connected to a rotary tension disk 9. This tension disk 9, driven by means of a rotating driver 5 including the main spindle 6, the belt mechanism 7, and the spindle drive motor 8, rotates about the main spindle 6.

The tension disk 9 has a circumferential periphery on which a flat, circular, ringed blade member 10 of doughnut shape is attached. This blade member 10 has an internal cutting edge 11 secured to an internal circumferential periphery thereof. The internal cutting edge 11 is made of diamond grain or the like material.

The number of revolutions f per unit time (hereinafter referred to as merely "revolution number") of the tension disk 9 varies with time. The rotation of the tension disk 9 causes a displacement of the blade member 10 in an axial direction of the main spindle 6 or an axial direction of the blade member 10 (hereinafter referred to as "Z-axis direction"). The rotation of the tension disk 9 generates a centrifugal force acting on the circumferential periphery of the tension disk 9. The centrifugal force is in proportion with the revolution number f. Accordingly, the revolution number f determines a magnitude and direction of displacement in the Z-axis direction.

The slide table 3 carries a holding member 15 and a dividing feeder 18. The holding member 15 can slide on a guide rail 23 extending in the axial direction of the blade member 10, and holds one end of a work 30 made of silicon semiconductor ingot or the like material. The dividing feeder 18 includes a ball screw 16 and a holding member drive motor 17 for rotating this ball screw 16. By the dividing feeder 18, the holding member 15 is slidably moved in the Z-axis direction so that one end of the work 30 slightly protrudes passing through a central hole of the blade member 10 from a front side 10a to a rear side 10b of the blade member 10.

The slide table 3 carries a dress device 19. The dress device 19 is provided to dress the internal cutting edge 11. The dress device 19 has a tool whose tip is disposed close to the internal cutting edge 11 of the blade member 10.

On the base 1, there is provided a cutting feeder 14 which comprises a ball screw 12 and a cutting feed motor 13 for rotating the ball screw 12. By the cutting feeder 14, the slide table 3 can slide on the guide rails 2, 2 in a direction perpendicularly intersecting the axis of the main spindle 6 (i.e., a direction from front to rear or from rear to front in FIG. 2, hereinafter referred to as "X-axis direction"). Accordingly, by moving the slide table 3 in the X-axis direction, the work 30 is moved relative to the blade member 10 in a radial direction of the blade member 10 (i.e., the direction of the arrow A1 in FIG. 3). The work 30 is disposed in the central hole of the blade member 10 and is then moved relative to the rotating blade member 10 to slice a part of the work 30 by the internal cutting edge 11 of the blade member 10 to produce a wafer.

Further, the work 30 is fixedly attached with a slice base 31 made of carbon or the like material at a final cut portion where the internal cutting edge 11 finishes the cutting operation of the work 30. This final cut portion corresponds to an outer peripheral edge of the work 30 downstream of the cutting feed direction. The attachment of the slice base 31 on the work 30 aims at preventing the cutting resistance acting on the blade member 10 from being suddenly released at the finish of the cutting operation of the work 30. For the presence of the slice base 31, the final cut of the work 30 can be accomplished without any damage.

Figure 1A:
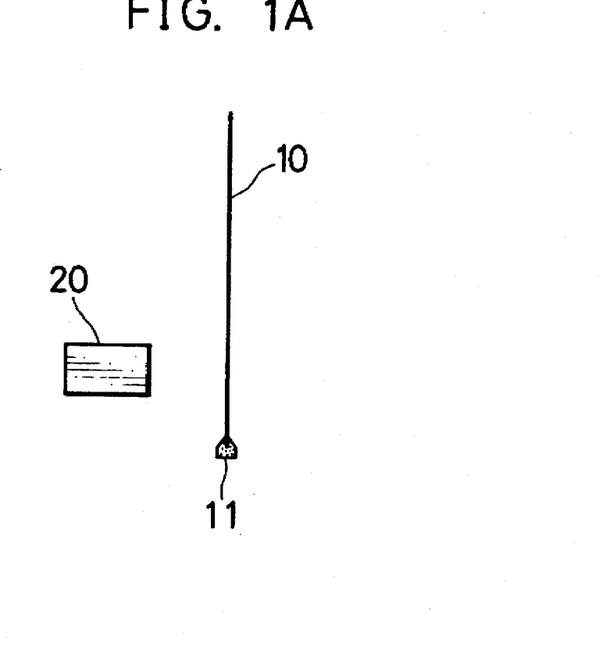
FIGS. 1A and 1B are diagrams showing a positional relationship between a flexure detecting sensor and a blade member of a slicing apparatus embodying the present invention, FIG. 1A showing a state that a wafer does not intervene between the flexure detecting sensor and the blade member, and FIG. 1B showing another state that a wafer intervenes between the flexure detecting sensor and the blade member.
Figure 1B:
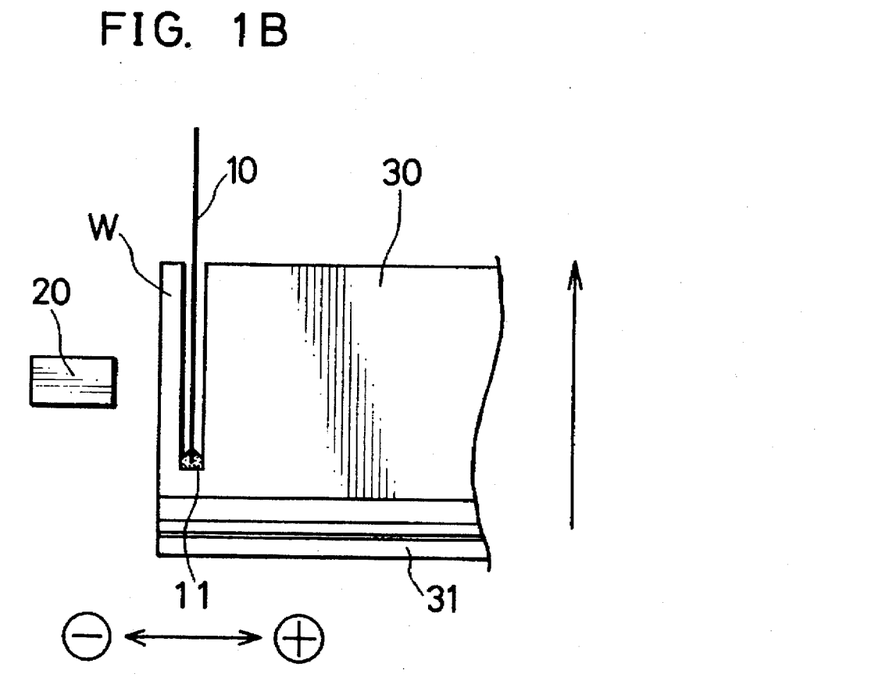

A flexure detecting sensor 20 is provided near the blade member 10 for detecting a displacement of the blade member 10 at an inner portion of the blade member 10 with respect to the Z-axis direction due to a flexure of the blade member 10. The flexure detecting sensor 20 is a distance detecting sensor (in this embodiment, of an eddy current type). The flexure detecting sensor 20 is, as shown in FIGS. 1A and 1B, disposed at a position facing an inner portion of the rear side 10b of the blade member 10. A wafer W, which is being sliced off from the work 30, comes into a position between the sensor 20 and the blade member 10 during the slicing operation.

Figure 4:
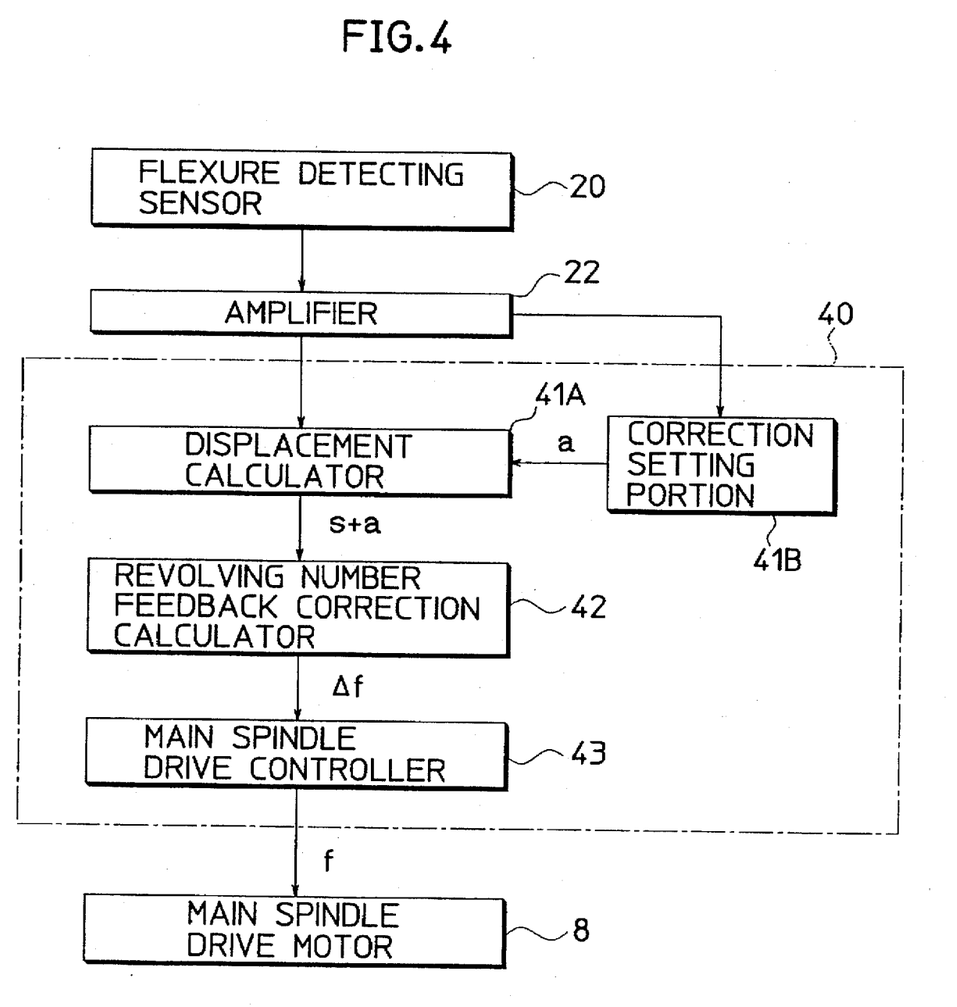
FIG. 4 is a block diagram showing a construction of a controlling portion incorporated in the slicing apparatus.

As shown in FIG. 4, the flexure detecting sensor 20 is connected to a controlling portion 40 by way of an amplifier 22. The controlling portion 40 controls the driving of the main spindle drive motor 8 to rotate the main spindle in accordance with a detection of displacement of the blade member 10 in the Z-axis direction, while controlling the driving of the cutting feed motor 13 and the holding member drive motor 17. The controlling portion 40 comprises a displacement calculator 41A, a correction setting portion 41B, a revolving number feedback correction calculator 42, and a main spindle drive controller 43. These elements 41A, 41B, 42, and 43 are adapted for controlling the driving of the main spindle drive motor 8.

The displacement calculator 41A stores as a reference position a position of the inner portion of the blade member 10 which is detected by the flexure detecting sensor 20 at a time when the work 30 is moved by the cutting feed motor 13 to a position immediately before the cutting operation is started, i.e., a position immediately before the work 30 comes into contact with the internal cutting edge 11 of the blade member 10. The time when the reference position is detected is hereinafter referred to as "reference time". The position immediately before the work 30 comes into contact with the internal cutting edge 11 is hereinafter referred to as "before-cutting position".

Upon start of the cutting, the displacement calculator 41A calculates a difference between the reference position and a position of the inner portion of the blade member 10 which is detected by the flexure detecting sensor 20 at a specified interval, and outputs the calculated difference as a basic displacement s.

The correction setting portion 41B sets a correction value a so as to reduce an influence to a detection result caused by an intervention of a wafer W based on a change of detection output from the flexure detecting sensor 20. The change of detection output is caused by a shift from a state, as shown in FIG. 1A, where the sensor 20 directly faces the blade member 10 with no intervention of the wafer W to a state, as shown in FIG. 1B, where the wafer W intervenes between the sensor 20 and the blade member 10. The correction setting portion 41B stores the correction value a. Setting of the correction value a by the correction setting portion 41B will be described in detail later. The displacement calculator 41A adds a correction value a output from the correction setting portion 41B to the basic displacement s stored therein, and outputs a calculation result as a displacement D.

The revolving number feedback correction calculator 42 calculates a revolving number feedback correction amount Δf for correcting the revolution number of the blade member 10 based on the displacement D output from the displacement calculator 41A to reduce the displacement D.

The main spindle drive controller 43 outputs a control signal to the main spindle drive motor 8 to control the revolution number of the blade member 10. Specifically, the main spindle drive controller 43 controls the main spindle drive motor 8 to rotate the blade member 10 at a predetermined reference revolution number fo immediately before start of the cutting. Upon start of the cutting, the main spindle drive motor 8 is driven to rotate the blade member 10 at a revolution number f which is obtained by adding the feedback correction amount Δf to the reference revolution number fo, i.e., f=fo+Δf.

Next, an operation of the slicing apparatus will be described.

The controlling portion 40 activates the main spindle drive motor 8 in the rotating driver 5 to rotate the tension disk 9 at the reference revolution number fo. Simultaneously, the controlling portion 40 activates the holding member drive motor 17 in the diving feeder 18 to slidably move the work 30 toward the main spindle 6 along the Z-axis direction while holding the work 30 by the holding member 15. Consequently, the work 30 is advanced from the front side 10a of the blade member 10 to the rear side 10b through the center hole of the blade member 10, and is held at a cutting start position Zo where the forward end of the work 30 is beyond the blade member 10 by a given amount.

Subsequently, the controlling portion 40 activates the cutting feed motor 13 in the cutting feeder 14 to feed the work 30 in a radial direction of the blade member 10 at a specified cutting feed speed. Upon the work 30 having reached the before-cutting position, the flexure detecting sensor 20 detects a position of the inner portion of the blade member 10, and the displacement calculator 41A stores the detected position as the reference position.

After start of the cutting, the blade member 10 flexes due to the cutting resistance and then displaces from the reference position in the Z-axis direction. The displacement D of the blade member 10 in the Z-axis direction is calculated by the displacement calculator 41A at a specified interval. The feedback correction calculator 42 calculates the feedback correction amount $\Delta f$ based on the displacement D to reduce the displacement D. The main spindle drive controller 43 controllably drives the main spindle 8 so that the revolution number f is corrected by implementing the equation: $f=fo+\Delta f$. The flexure of the blade member 10 during the slicing operation is suppressed by controlling the revolution number of the blade member 10.

Figure 5:
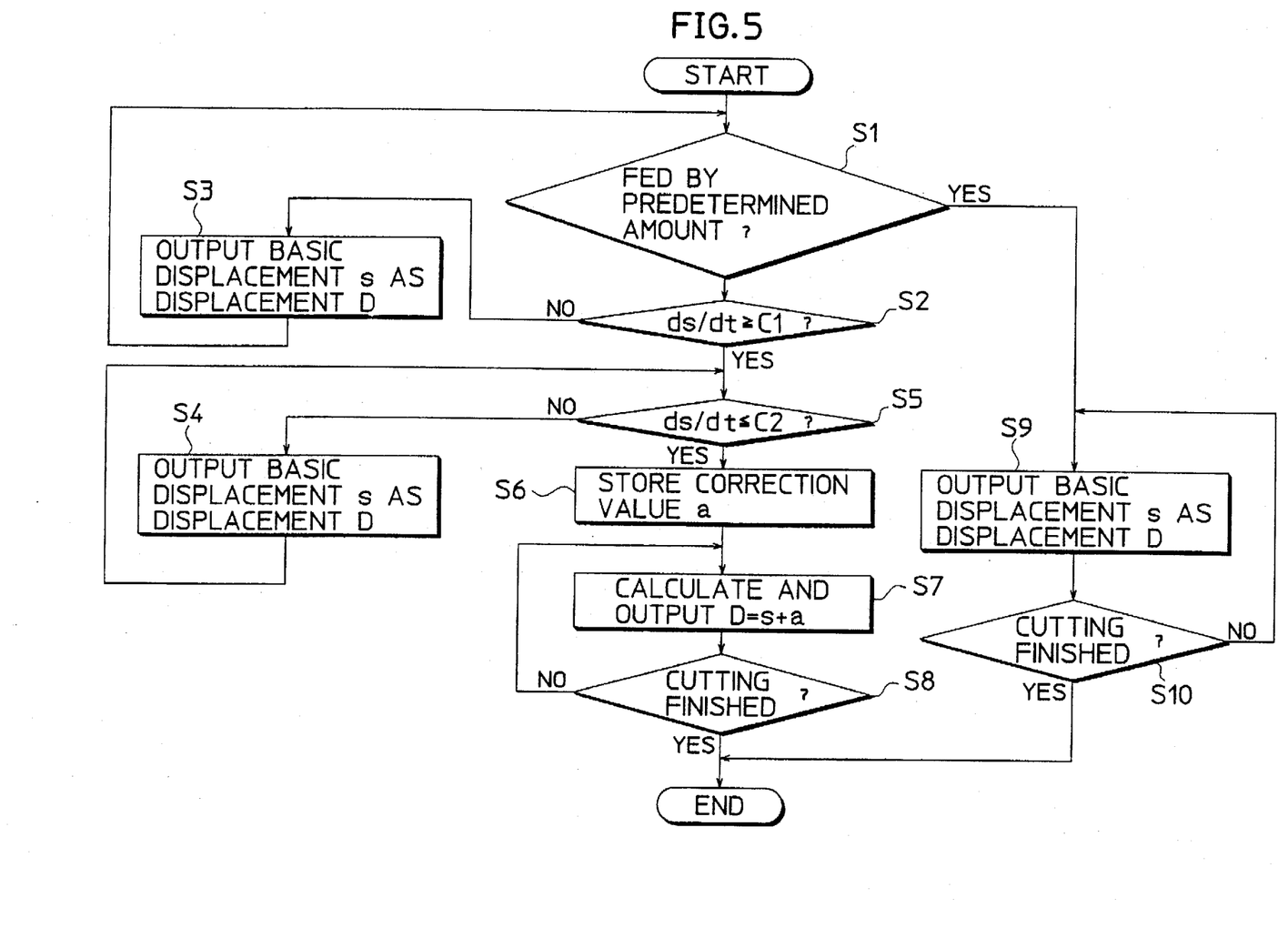
FIG. 5 is a flowchart showing an operation of detecting a displacement of the blade member.

Next, an operation of detecting a displacement of the blade member 10 by the controlling portion 40 will be described with reference to a flowchart in FIG. 5.

First, the cutting feed motor 13 is started, and the work 30 is fed in the radial direction of the blade member 10, i.e., in the X-axis direction at a specified speed. Subsequently, it is judged in Step S1 whether or not the work 30 is fed in the X-axis direction by a predetermined feeding amount. The predetermined feeding amount corresponds to a distance from the position where the slicing operation of the work 30 is started to a position where a wafer W being sliced from the work 30 intervenes between the flexure detecting sensor 20 and the blade member 10. If it is judged that the work 30 has not been fed by the predetermined feeding amount (NO in Step S1), the routine proceeds to Step S2 where it is judged whether or not the rate of change in the basic displacement s with respect to a specified time t, i.e., ds/dt, is not smaller than a first predetermined value C1 (ds/dt≧C1). If it is judged that ds/dt is smaller than C1 (NO in Step S2), the routine proceeds to Step S3 where the basic displacement s is output as the displacement D without adding the correction value a.

On the contrary, if it is judged that ds/dt is not smaller than C1 (YES in Step S2), it is then judged that the wafer W intervenes between the flexure detecting sensor 20 and the blade member 10, and the routine goes to Step S5. In Step S5, it is judged whether or not ds/dt is not larger than a second predetermined value C2 (ds/dt≦C2, C2<C1). If it is judged that ds/dt is larger than C2 (NO in Step S5), the routine proceeds to Step S4 where the basic displacement s is still output as the displacement D without adding the correction value a. On the contrary, if it is judged that ds/dt is not larger than C2 (YES in Step S5), the routine proceeds to Step S6 where calculated is a difference between a displacement value detected just when it is judged that ds/dt is not larger than C2 (YES in Step S5) and a displacement value detected just when it is judged that ds/dr is not smaller than C1 (YES in Step S2), and the difference is stored as the correction value a (see the graph in FIG. 6B). Thereafter, the routine proceeds to Step S7 where the displacement D is calculated by executing the equation: D=s+a, and the displacement D is output to the revolving number feedback correction calculator. The operation in Step S7 is repeated until the cutting is finished (YES in Step S8). If it is judged that the cutting is finished (YES in Step S8), the routine ends.

Figure 6A:
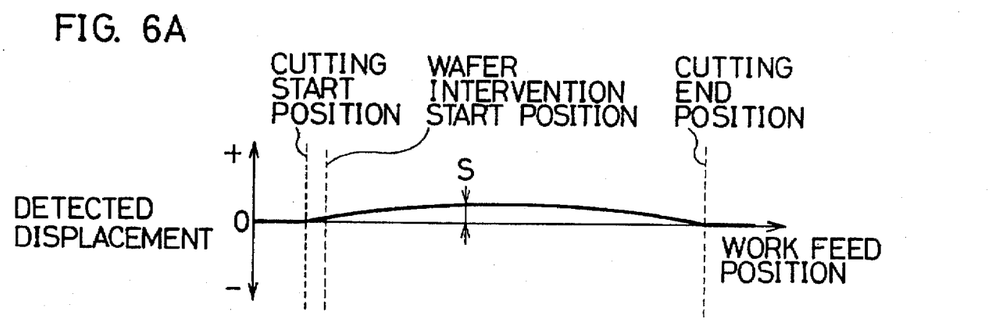
FIGS. 6A and 6B are graphs showing a relationship between a work feed position and a detected displacement, FIG. 6A showing a relationship in the case where intervention of a wafer little affects the detection, and FIG. 6B showing a relationship in the case where intervention of a wafer affects the detection.
Figure 6B:
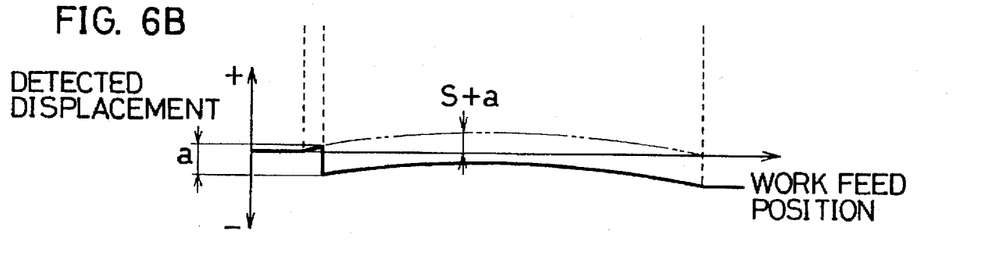

On the other hand, if the work 30 has been fed in the X-axis direction by the predetermined feeding amount before ds/dr reaches the first value C1 (YES in Step S1), it can be judged that the electrical resistivity of the work 30 is relatively large and the intervention of the wafer W little affects the displacement detection as shown in the graph in FIG. 6A. Accordingly, the basic displacement s is output as the displacement D without adding the correction value a (Step S9), and the operation in Step S9 is repeated until it is judged that the cutting is finished (YES in Step S10).

In the foregoing embodiment, even if the displacement of the blade member 10 is detected in a state that the wafer W is interposed between the flexure detecting sensor 20 and the blade member 10, the correction value a is calculated and set based on a detection change of the sensor 20 which is caused by of the intervention of the wafer W. Accordingly, the influence caused by the intervention of the wafer can be eliminated by setting the correction value a, and the flexure of blade member can be accurately detected constantly irrespective of the material, shape, dimension of the work 30 or thickness and warp of the wafer W.

The present invention is not limited to the foregoing embodiment, but may be applicable to the following various modifications.

(1) In the foregoing embodiment, the flexure detecting sensor 20 is of an eddy current type. However, the present invention is applicable to other distance detecting sensors, such as ultrasonic sensor, X-ray sensor, and can assure the same effect as the sensor of eddy current type.

(2) In the foregoing embodiment, the intervention of a sliced wafer is judged based on the rate of change in the basic displacement s with respect to time t (ds/dt). In the case where works 30 to be cut have constant shape and dimension, it may be appreciated to store in advance the position where the intervention of a wafer W starts, and then judge an intervention of a wafer W when the work 30 reaches the stored position. However, it should be noted that the rate of change in the basic displacement s with respect to time (ds/dt) is advantageous in detecting the start time of intervention of a wafer W reliably and accurately regardless of the shape and dimension (especially, regardless of the diameter) of the works 30.

(3) In the foregoing embodiment, the correction value is set based on the difference between the actual detection output before and after the intervention of a wafer W. However, in the case where the variation in the thickness of sliced wafers is considerably small, it may be appreciated to set a predetermined correction value referring to the electrical resistivity of the work and the graph in FIG. 7, and store the predetermined correction value in correction storage means, and to output a displacement for correction based on the stored correction value. In this case, it is possible to set the time to start correction, i.e., the time when it is judged that the intervention of a wafer is started at the time when the rate of change in the detection output from the flexure detecting sensor 20 becomes at first larger than the first value C1 and thereafter becomes smaller than the second value C2 which is smaller than the first value C1. Alternatively, it is possible to store in advance the position where the intervention of a wafer starts, and to start the correction at the time when the work 30 is fed relative to the blade member 10 along the X-axis direction up to the position.

(4) In the foregoing embodiment, the work 30 is moved in the X-axis direction for the cutting feed operation. Alternatively, it may be appreciated to move the tension disk 9 in the X-axis direction.

Although the present invention has been fully described by way of example with reference to the accompanying drawings, it is to be understood that various changes and modifications will be apparent to those skilled in the art.

Therefore, unless otherwise such changes and modifications depart from the scope of the present invention, they should be construed as being included therein.

What is claimed is:

1. A detecting device for use in a slicing apparatus which includes a blade member having an internal cutting edge in the form of a circle, a rotating driver for rotating the blade member about a center of the circle of the internal cutting edge, and a radial movement driver for producing relative movement between the blade member and a work in a radial direction of the blade member so that an end portion of the work is cut into a cut piece by the internal cutting edge of the blade member comprising:

a detector disposed at a position spaced away from the blade member and the work such that the cut piece intervenes between the detector and the blade member, said detector detecting the distance from the detector to the blade member through the cut piece; and a corrector correcting the detector so that the detector is precluded from being influenced by the intervention of the cut piece between the detector and the blade member as said detector detects said distance through the cut piece.

2. A detecting device according to claim 1 wherein said detector detects said distance just before the intervention of the cut piece between the detector and the blade member and also detects the distance between the detector and the cut piece just after intervention of the cut piece between the detector and the blade member, said detector providing a correction value based on the difference between the distance detected before said intervention and the distance detected after said intervention.

3. A detecting device according to claim 2 wherein said corrector includes storage means for storing said correction value.

4. A detecting device according to claim 1 wherein said corrector determines that a first rate of change of said detected amount has exceeded a first determined value and, after determining that said first rate of change has exceeded said first predetermined value, determines that a second rate of change of said detected amount has reached a value less than a predetermined value which is less than said first predetermined value, said corrector correcting said detector after said corrector has determined that said first rate of change has exceeded said first predetermined value and also that said detector has determined that said second rate of change has reached a value less than said second predetermined value.

5. A detecting device according to claim 1 wherein said corrector includes a storage means for storing a correction based on the resistivity of said work, said corrector correcting the detected distance based on said stored correction value.

6. A detecting device according to claim 5 wherein said detector determines that a first rate of change of said detected amount has exceeded a first predetermined value and subsequently thereto, determines that a second rate of change of said detected amount has reached a value less than a second predetermined value which is less than said first predetermined value, said corrector correcting said detected distance after said detector has determined that said first rate of change has exceeded said first predetermined value and after said detector has determined that said second rate of change has reached a value less than said second predetermined value.

7. A detecting device according to claim 1 wherein said corrector includes a storage means for storing a starting value representing the starting position at which the intervention of the cut piece between the detector and the blade member starts, said corrector correcting said detected amount based on said stored starting value after said blade member reaches said starting position.

8. A detecting device for use in a slicing apparatus which includes a blade member having an internal cutting edge in the form of a circle, a rotating driver for rotating the blade member about a center of the circle of the internal cutting edge, and a radial movement driver for producing relative movement between the blade member and a work in a radial direction of the blade member so that an end portion of the work is cut into a cut piece by the internal cutting edge of the blade member comprising:

a detector disposed at a position spaced away from the blade member and the work such that the cut piece intervenes between the detector and the blade member, said detector detecting the distance from the detector to the blade member through the cut piece; and a corrector for determining whether the detector is being influenced by the intervention of the cut piece between the detector and the cutting blade.

9. A detecting device according to claim 8 wherein said corrector corrects said detected distance when said corrector determines that said detector is being influenced by the intervention of the cut piece between the detector and the blade member as said detector detects said distance through said cut piece.

10. A detecting device according to claim 8 wherein said corrector refrains from correcting said detected distance when said corrector determines that said detector is not being influenced by the intervention of the cut piece between the detector and the blade member as said detector detects said distance through said cut piece.

11. A slicing apparatus comprising:

a blade member having an internal cutting edge in the form of a circle;

a rotating driver for rotating the blade member about a center of the circle of the internal cutting edge;

a radial movement driver for producing relative movement between the blade member and a work in a radial direction of the blade member so that an end portion of the work is cut into a cut piece by the internal cutting edge of the blade member;

a detector disposed at a position spaced from the blade member and the work such that the cut piece intervenes between the detector and the blade member, said detector detecting the distance between the detector and the blade member through said cut piece; and a corrector which corrects the detector so that the detector is prevented from being influenced by the intervention of the cut piece between the detector and the blade member as said detector detects said distance through said cut piece.

12. A detecting method for detecting flexure of a blade member having an internal cutting edge in the form of a circle and wherein a rotating driver is provided for rotating the blade member about a center of the circle of the internal cutting edge and a radial movement driver is provided for producing relative radial movement between the blade member and a work in a radial direction of the blade member so that an end portion of the work is cut into a cut piece by the internal cutting edge of the blade, the detecting method comprising:

positioning a detector spaced from the blade member and the work such that the cut piece intervenes between the detector and the blade member;

detecting the distance between the detector and the blade member through said intervening cut piece; and correcting said detected distance so that the detector is precluded from being influenced by the intervention of the cut piece between the detector and the blade member as said detector detects said distance through the cut piece.

13. A method according to claim 12 further comprising the steps of:

detecting the distance between the detector and the blade member before the intervention of the cut piece between the detector and the blade member;

detecting the distance between the detector and the cut piece after intervention of the cut piece between the detector and the blade member; and providing a correction value based on the difference between the distance detected before said intervention and the distance detected after said intervention.

14. A method according to claim 13 further comprising:

detecting the rate of change of said detected distance as said cut piece is being cut;

determining a first rate of change of said detected amount which exceeds a first predetermined value;

determining a second rate of change of said detected value which is less than a second predetermined value which is less than said first predetermined value;

determining that said first rate of change of said detected amount exceeds said first predetermined value prior to determining that said second rage of change of said detected amount is less than said second predetermined value;

determining the difference between said first and second rate of change; and utilizing said difference between said first and second rate of change as a correction value to correct said detected distance.

15. A method for cutting and detecting the flexure of a blade member having an internal cutting edge in the form of a circle comprising the steps of:

rotating the blade member about a center of the circle of the internal cutting edge;

effecting relative radial movement between the blade member and a work in a radial direction of the blade member;

cutting an end portion of the work into a cut piece utilizing the internal cutting edge of the blade;

positioning a detector spaced from the blade member and the work such that the cut piece intervenes between the detector and the blade member;

detecting the distance between the detector and the blade member through said intervening cut piece; and correcting said detected distance so that the detector is precluded form being influenced by the intervention of the cut piece between the detector and the blade member as said detector detects said distance through the cut piece.

* * * * *